Feb. 17, 1931. F. X. SCHUHBAUER ET AL 1,793,418
ELECTRICAL LOCK
Filed May 8, 1930
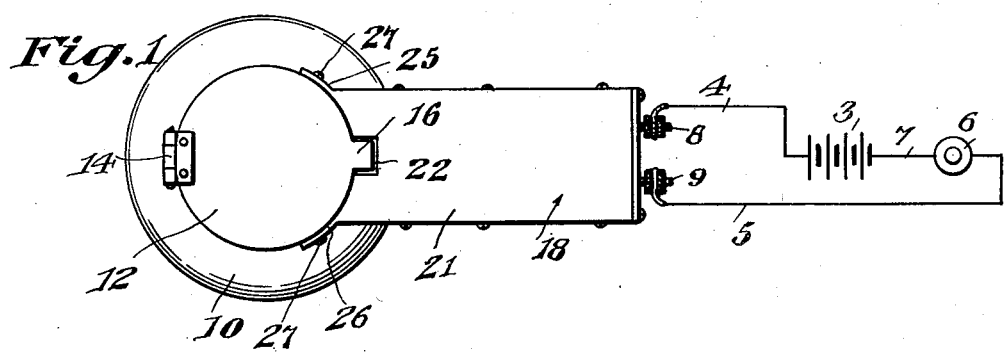
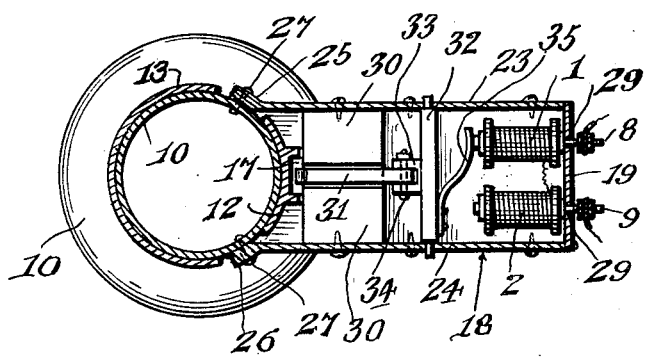
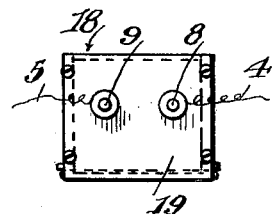
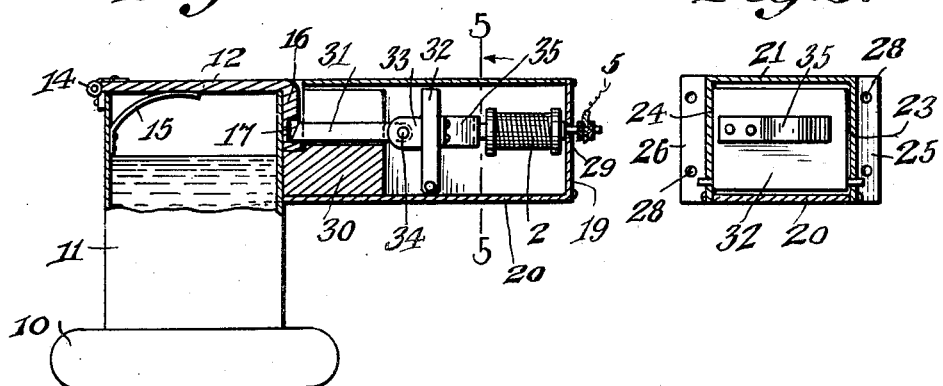
INVENTORS
Frank X. Schuhbauer,
BY George Niklas,
Geo. P. Kimmel
ATTORNEY.

Patented Feb. 17, 1931

1,793,418

UNITED STATES PATENT OFFICE

FRANK X. SCHUHBAUER AND GEORGE A. NIKLAS, OF BUTTE, MONTANA

ELECTRICAL LOCK

Application filed May 8, 1930. Serial No. 450,824.

This invention relates to a locking device of the electrically releasable type and is designed primarily for use in connection with closure caps for gasoline tanks carried by automotive vehicles, but it is to be understood that a locking device of the electrically releasable type in accordance with this invention may be employed in any connection for which it may be found applicable, and the invention has for its object to provide, in a manner as hereinafter set forth, a locking device of the class referred to which prevents the opening of the gasoline tank surreptitiously to remove the contents thereof.

A further object of the invention is to provide, in a manner as hereinafter set forth, an electrically releasable locking device for the purpose referred to for installation with an automotive vehicle and in a normally open circuit and with the circuit connection arranged whereby it is necessary to close the circuit from within the vehicle body to provide for the releasing of the cap of the tank when occasion requires.

Further objects of the invention are to provide, in a manner as hereinafter set forth, an electrically releasable locking device for the purpose referred to which is simple in its construction and arrangement, strong, durable, compact, readily installed with respect to an automotive vehicle and gasoline tank, thoroughly efficient in its use for the purpose intended thereby, and comparatively inexpensive to set up.

With the foregoing and other objects in view the invention consists of the novel construction, combination and arrangement of parts as hereinafter more specifically described, and illustrated in the accompanying drawings wherein is shown an embodiment of the invention, but it is understood that changes, variations and modifications can be resorted to which fall within the scope of the claims hereunto appended.

In the drawings wherein like reference characters denote corresponding parts throughout the several views:—

Figure 1 is a top plan view of an electrically releasable locking device in accordance with this invention showing the adaptation thereof with respect to the cap of a gasoline tank.

Figure 2 is a fragmentary view in sectional plan of a locking device as applied to the body and cap of the tank.

Figure 3 is a longitudinal sectional view illustrating the locking device and cap in corelative position.

Figure 4 is a fragmentary view in elevation looking towards the forward end of the casing forming an element of the device.

Figure 5 is a section on line 5—5 Figure 3.

The electrically releasable locking device includes a pair of magnetic coils 1, 2 arranged in opposed, spaced parallel relation and electrically connected together. The coils 1, 2 are normally in an open circuit leading from a source of electrical energy, such as a battery 3 carried by the vehicle. The normally open circuit includes a conductor 4 leading from battery 3 to coil 1, a conductor 5 leading from coil 2 to a circuit opening and closing device 6 and a conductor 7 leading from the circuit opening and closing device 6 to the battery 3. Preferably the circuit opening and closing device 6 will be carried by the dash board of the vehicle. The conductors 4, 5 are attached to binding posts 8, 9 which are electrically connected with the coils 1, 2.

There is illustrated a gasoline tank 10 provided with a filling neck 11 normally closed by a spring controlled cap 12. The cap 12 includes a rim 13 which is hinged as at 14 to the neck 11. Carried by the neck 11 or rather secured to the neck 11 and bearing against the inner face of the cap 12 is a controlling spring 15 which normally functions to project the cap to open position. When the cap 12 is closed it is arranged against the action of the spring 15. The rim 13 of cap 12 is formed with a lateral enlargement 16 which depends below the bottom edge of rim 13 and has its outer face at a point below the rim 13 formed with a pocket 17 to receive the locking bolt of the device for the purpose of maintaining the cap 12 in closure position with respect to the neck 11. The lateral enlargement 16 forms a keeper for the locking bolt of the device and such locking bolt will be presently referred to.

The locking device includes a casing which projects forwardly from and is secured to the neck 11 below the rim 13. The casing is generally indicated at 18 and comprises a closed forward end 19, a bottom 20, a top wall 21 having an opening 22 to provide a clearance for the enlargement 18, and a pair of side walls 23, 24 flanged as at 25, 26 respectively. The rear end of the casing 18 is open and is of arcuate contour to conform to the shape of the neck 11. The flanges 25, 26 are secured by the holdfast devices 27 to the neck 11 whereby the casing 18 is anchored in forwardly extending relation with respect to the neck 11. The flanges 25, 26 are apertured as at 28 for the passage of the holdfast devices 27. The forward wall 19 has openings 29 for the passage of the binding posts 8, 9. The magnetic coils 1, 2 are arranged in close proximity to the wall 19.

Secured within the casing 18 at the rear end thereof is a grooved block 30 which provides a guide for a locking bolt 31. Pivotally connected to the side walls 23, 24 of the casing 18 is an upstanding shifting element 32 for the bolt 31 and which constitutes an armature common to the two coils 1, 2. The element 32 has projecting from its rear face a yoke 33, to which is pivotally connected, as at 34, the forward end of the locking bolt 31. The rear end of the locking bolt 31 is adapted to engage in the pocket 17 for the purpose of maintaining the cap 12 in closure position with respect to the neck 11. Interposed between the element 32 and the coils 1, 2 as well as bearing against the coil 1 and fixedly secured to element 32 is a resilient member 35 normally functioning to maintain the bolt 31 in engagement with the pocket 17.

When the circuit is closed, the coils 1, 2 function to draw the element 32 towards them, which compresses the spring 35 and withdraws the bolt 31 from the pocket 17, whereby the cap 12 will be released and the spring 15 will force cap 12 to an open position.

The cover 12 is normally maintained in closure position with respect to the neck 11 by the action of the spring 35 on the element 32.

It is thought the many advantages of a locking device in accordance with this invention and for the purpose referred to can be readily understood, and although the preferred embodiment of the invention is as illustrated and described, yet it is to be understood that changes in the details of construction can be had which fall within the scope of the invention as claimed.

What we claim is:

1. A locking device comprising a bodily shiftable locking bolt, a normally open releasing circuit for said bolt including a pair of magnetic coils and a circuit opening and closing device, and a spring controlled pivoted shifting element pivotally connected to and normally retaining said bolt in locking engagement, the controlling spring for said shifting element being interposed between the latter and said magnets and normally extended, said element constituting an armature common to said magnets, said magnets when said circuit is closed being energized providing for the shifting of said element towards them whereby the locking bolt is shifted from locking engagement against the action of said controlling spring.

2. In a locking device, a locking bolt, a spring controlled pivoted element normally acting on said bolt for normally retaining it in locking engagement, a pivotal connection between one end of the bolt and said element, and a normally open bolt releasing circuit including a pair of magnets and a circuit opening and closing device, said magnets when said circuit is closed being energized and acting on said element to shift it in a direction to move the bolt out of locking engagement against the action of the controlling spring for such element, the controlling spring for said element being interposed between the latter and said magnets, and a guide for said bolt.

In testimony whereof, we affix our signatures hereto.

FRANK X. SCHUHBAUER.
GEORGE A. NIKLAS.